(12) United States Patent
Li et al.

(10) Patent No.: US 11,892,765 B2
(45) Date of Patent: Feb. 6, 2024

(54) PROJECTION SCREEN

(71) Applicant: APPOTRONICS CORPORATION LIMITED, Guangdong (CN)

(72) Inventors: Shijie Li, Shenzhen (CN); Lin Wang, Shenzhen (CN); Fei Hu, Shenzhen (CN); Wei Sun, Shenzhen (CN); Yi Li, Shenzhen (CN)

(73) Assignee: APPOTRONICS CORPORATION LIMITED, Guangdong (CN)

( * ) Notice: Subject to any disclaimer, the term of this patent is extended or adjusted under 35 U.S.C. 154(b) by 45 days.

(21) Appl. No.: 17/595,800

(22) PCT Filed: May 18, 2020

(86) PCT No.: PCT/CN2020/090757
§ 371 (c)(1),
(2) Date: Nov. 24, 2021

(87) PCT Pub. No.: WO2020/238663
PCT Pub. Date: Dec. 3, 2020

(65) Prior Publication Data
US 2022/0221780 A1    Jul. 14, 2022

(30) Foreign Application Priority Data

May 30, 2019    (CN) .......................... 201910463752.4

(51) Int. Cl.
*G03B 21/60*    (2014.01)
*G02B 5/02*    (2006.01)
(Continued)

(52) U.S. Cl.
CPC ........... *G03B 21/60* (2013.01); *G02B 5/0205* (2013.01); *G03B 21/56* (2013.01); *G03B 21/58* (2013.01); *G03B 21/62* (2013.01); *G03B 21/625* (2013.01)

(58) Field of Classification Search
CPC ........ G03B 21/60; G03B 21/56; G03B 21/58; G03B 21/625; G03B 21/62; G02B 5/0205
(Continued)

(56) References Cited

U.S. PATENT DOCUMENTS

| | | | |
|---|---|---|---|
| 2007/0030566 A1* | 2/2007 | Chang | G02B 27/285 |
| | | | 359/489.06 |
| 2007/0146879 A1* | 6/2007 | Yoshikawa | G03B 21/10 |
| | | | 359/460 |

(Continued)

FOREIGN PATENT DOCUMENTS

| | | | | |
|---|---|---|---|---|
| CN | 1987527 | | 6/2007 | |
| CN | 1987527 A | * | 6/2007 | ............. G02B 5/045 |

(Continued)

OTHER PUBLICATIONS

International Search Report for International Application PCT/CN2020/090757, dated Aug. 18, 2020.

(Continued)

*Primary Examiner* — Stephanie E Bloss
*Assistant Examiner* — Kevin C Butler
(74) *Attorney, Agent, or Firm* — Burris Law, PLLC

(57) ABSTRACT

A projection screen includes a substrate with a first substrate surface. The first substrate surface includes a first region and a second region adjacent to the first region. Multiple first wire grid bodies extending in a first direction are provided in the first region. Multiple second wire grid bodies extending in the first direction are provided in the second region. Each first wire grid body includes a first contact surface connected to the substrate and a first surface, and a first angle is formed therebetween. The first angles gradually decrease in a direction from the first region to the second region. Each second wire grid body includes a second contact surface connected to the substrate and a third surface, and a third (Continued)

angle is formed therebetween. The third angles gradually increase in a direction from the first region to the second region.

20 Claims, 8 Drawing Sheets

(51) Int. Cl.
  *G03B 21/625* (2014.01)
  *G03B 21/56* (2006.01)
  *G03B 21/58* (2014.01)
  *G03B 21/62* (2014.01)
(58) Field of Classification Search
  USPC .......................................................... 359/443
  See application file for complete search history.

(56) References Cited

U.S. PATENT DOCUMENTS

| | | | | |
|---|---|---|---|---|
| 2010/0097699 | A1* | 4/2010 | Destain | G03B 21/60 |
| | | | | 359/454 |
| 2013/0265523 | A1* | 10/2013 | Su | G02B 6/0073 |
| | | | | 362/602 |
| 2019/0302329 | A1* | 10/2019 | Jin | G02F 1/133606 |
| 2020/0387061 | A1* | 12/2020 | Wang | G03B 21/56 |
| 2021/0011339 | A1* | 1/2021 | Yang | G02F 1/133616 |
| 2021/0165139 | A1* | 6/2021 | Jin | G02F 1/133606 |
| 2022/0221780 | A1* | 7/2022 | Li | G02B 5/0263 |
| 2022/0373875 | A1* | 11/2022 | Hu | G03B 21/60 |

FOREIGN PATENT DOCUMENTS

| | | | | |
|---|---|---|---|---|
| CN | 102620212 A | * | 8/2012 | ............. G02B 27/00 |
| CN | 103809357 | | 5/2014 | |
| CN | 103838034 A | * | 6/2014 | ........... G02B 27/126 |
| CN | 104317153 | | 1/2015 | |
| CN | 105785703 | | 7/2016 | |
| CN | 105785703 A | * | 7/2016 | ............. G03B 21/60 |
| CN | 108469642 | | 8/2018 | |
| CN | 108469642 A | * | 8/2018 | ......... G02B 26/0891 |
| CN | 109188846 | | 1/2019 | |
| CN | 109188846 A | * | 1/2019 | ............. G03B 21/60 |
| CN | 109388013 | | 2/2019 | |
| CN | 112015040 A | * | 12/2020 | ........... G02B 5/0205 |
| CN | 112180672 A | * | 1/2021 | ......... G02B 27/0101 |
| CN | 109388014 B | * | 7/2021 | ............. G03B 21/60 |
| CN | 113219779 A | * | 8/2021 | |
| EP | 3985435 A1 | * | 4/2022 | ............. G03B 21/56 |
| JP | 2014010404 | | 1/2014 | |
| JP | 2014010404 A | * | 1/2014 | |
| WO | 2013108990 | | 7/2013 | |
| WO | WO-2013108990 A1 | * | 7/2013 | ............... B05B 5/06 |
| WO | 2016054795 | | 4/2016 | |
| WO | WO-2016054795 A1 | * | 4/2016 | ............. G03B 21/60 |
| WO | WO-2019024366 A1 | * | 2/2019 | ............. G03B 21/60 |
| WO | WO-2019024367 A1 | * | 2/2019 | ............. G03B 21/60 |
| WO | WO-2019024368 A1 | * | 2/2019 | ............... G02B 5/02 |
| WO | WO-2019227935 A1 | * | 12/2019 | ............. G03B 21/60 |
| WO | WO-2020093805 A1 | * | 5/2020 | ............. G02B 5/003 |
| WO | WO-2020238663 A1 | * | 12/2020 | ........... G02B 5/0205 |
| WO | WO-2021004301 A1 | * | 1/2021 | ......... G02B 27/0101 |
| WO | WO-2021078289 A1 | * | 4/2021 | ............. G03B 21/60 |
| WO | WO-2021217414 A1 | * | 11/2021 | ............... G02B 5/09 |

OTHER PUBLICATIONS

Office Action issued in corresponding CN Application 201910463752. 4, dated Jun. 27, 2022, and an English translation thereof, 12 pages.

* cited by examiner

PROJECTION SCREEN

CROSS-REFERENCE TO RELATED APPLICATIONS

This application is a national phase of International Application No. PCT/CN2020/090757, filed on May 18, 2020, which claims priority to and the benefit of CN 201910463752.4, filed on May 30, 2019. The disclosures of the above applications are incorporated herein by reference.

FIELD

The present disclosure relates to the field of projection, and particularly to a projection screen.

BACKGROUND

The statements in this section merely provide background information related to the present disclosure and may not constitute prior art.

A projection screen generally includes a diffusion layer, a substrate, and a reflection layer, which are successively stacked. The diffusion layer is provided towards viewers. Two kinds of light, projection and ambient light, are reflected to human eyes through the projection screen. The ambient light, as stray light, increases a minimum brightness of an image, thus reducing a contrast in an image displayed by projection. One solution is to selectively reflect the ambient light but the projection light. Namely, the projection light should be reflected while the reflection of the ambient light should be reduced as much as possible. Brightness gain is another important parameter for a projection system. Currently, an implementation method for increasing the brightness gain is to provide a micro-structural reflection on the projection screen such that the projection light focuses on emission at a certain angle as much as possible, so as to increase an image brightness in a range of orientation angle. Disadvantages for this method is that a visible angle of the projection screen is relatively small, rendering a non-uniform brightness problem in a vertical viewing angle.

SUMMARY

This section provides a general summary of the disclosure and is not a comprehensive disclosure of its full scope or all of its features.

An objective of the present application is to provide a projection screen, so as to solve a technical problem of a relatively small visible angle and a non-consistent brightness of the projection screen.

A projection screen is provided according to the present application. The projection screen includes: a substrate including a first substrate surface, wherein the first substrate surface includes a first area and a second area adjacent to the first area, the first area is provided with a plurality of first wire grid bodies extending along a first direction, and the second area is provided with a plurality of second wire grid bodies extending along the first direction;

each of the plurality of first wire grid bodies includes a first contact surface connected with the substrate, and a first surface, wherein a first angle is formed between the first contact surface and the first surface, and the first angles reduces gradually along a direction from the first area to the second area; and each of the plurality of second wire grid bodies includes a second contact surface connected with the substrate, and a third surface, wherein a third angle is formed between the second contact surface and the third surface, and the third angles increases gradually along the direction from the first area to the second area.

Further areas of applicability will become apparent from the description provided herein. It should be understood that the description and specific examples are intended for purposes of illustration only and are not intended to limit the scope of the present disclosure.

DRAWINGS

In order to describe embodiments of the present application or technical solutions in existing technology more clearly, appended drawings required to use in descriptions of embodiments or the existing technology will be described briefly below. Apparently, the appended drawings described below are only some embodiments of the present application, and a person skilled in the art can also obtain further drawings according to these drawings without creative efforts.

In order that the disclosure may be well understood, there will now be described various forms thereof, given by way of example, reference being made to the accompanying drawings, in which.

Figure 1:
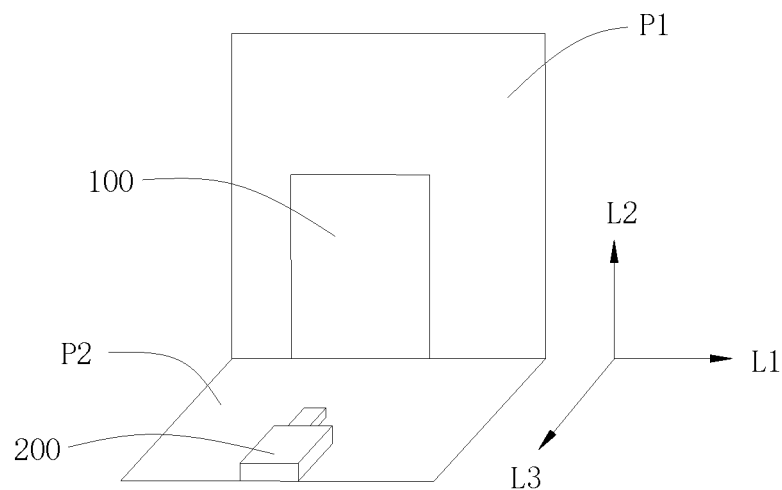
FIG. 1 is a structure schematic diagram of a relative position between a projection screen and a projector according to some embodiments of the present application.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Technical solutions in embodiments of the present application will be described clearly and completely in combination with the appended drawings in embodiments of the present application. Apparently, the described embodiments are only some of embodiments of the present application, while not all the embodiments. Based on the embodiments in the present application, all other embodiments obtained by a person skilled in the art without creative efforts fall in a scope protected by the present application.

Referring to FIG. 1 to FIG. 4, a projection screen 100 is provided according to the present application, which is used to reflect projection light from a projector 200. The projection screen 100 is located in a first plane P1, and the projector is located in a second plane P2 perpendicular to the first plane P1. It is noted that the projector 200 is located in front of the first plane such that the projection light can irradiate into the projection screen. It can be located in the second plane vertical to the first plane or not. The projection light is light of the projector 200 which carries image information.

An extension direction of an intersecting line between the first plane P1 and the second plane P2 is defined as a first direction L1, and a direction perpendicular to the first direction L1 in the first plane L1 is defined as a second direction L2.

Figure 2:
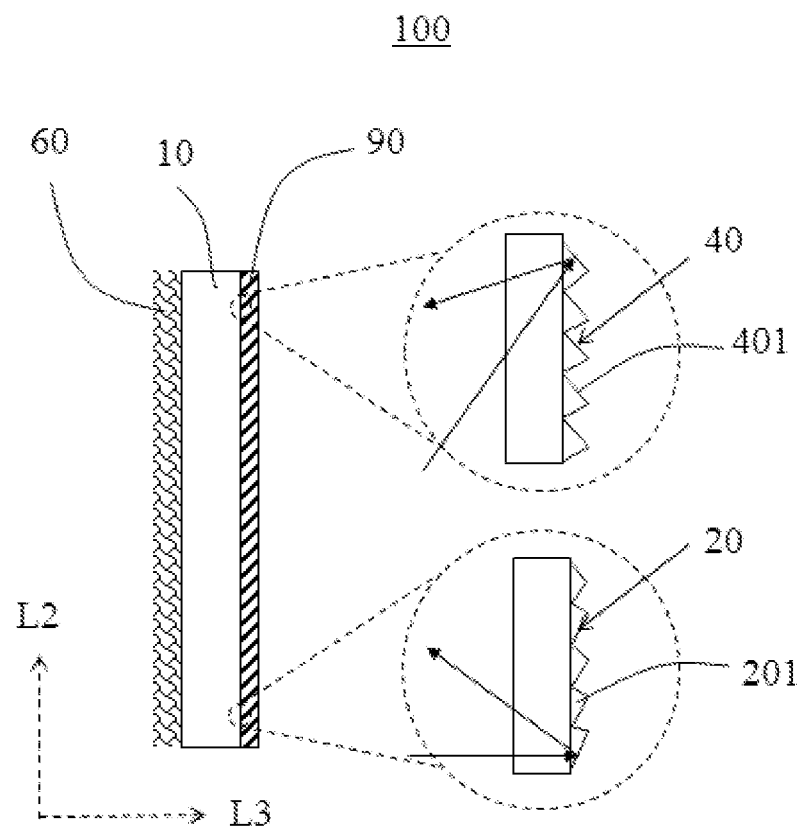
FIG. 2 is a lateral structure schematic diagram of the projection screen shown in FIG. 1.

Referring to FIG. 2, the projection screen 100 includes a substrate 10, a diffusion layer 60 and a reflection layer 90. The diffusion layer 60 is located at a side of the substrate 10 facing the projector 200, and the reflection layer 90 is located at a side of the substrate 20 away from the projector 200. Viewers will be located at a side close to the diffusion layer 60 of the projection screen, and the side corresponding to the reflection layer 90 is a side away from the viewer.

In the present application, a diffusion angle of the diffusion layer 60 is 5° to 30°. Organic resin particles in epoxy series, acrylic acid series or silicone series, or other inorganic scattering material may be used as material of the diffusion layer 60.

Material of the substrate 10 includes organic materials such as PET, PC, PVC and PMMA. A thickness of the substrate 10 ranges from 1 mm to 10 mm.

The reflection layer 90 includes reflective material and is used to reflect the projection light. In an implementation, the reflection layer 90 further includes absorbing material or diffusion material, to further strengthen a light absorption effect and a light diffusion effect of the reflection layer. The reflective material includes metallic reflection material such as an aluminum sheet, aluminum powder and silver powder. The absorbing material includes organic pigments and inorganic pigments. The organic pigments include AZO and so on, and the inorganic pigments include carbon black, graphite, metallic oxide and so on. Organic resin particles in epoxy series, acrylic acid series or silicone series, or other inorganic scattering material may be used as the diffusion material. A reflectivity of the reflection layer 90 is 30% to 60%, in some embodiments, the reflectivity of the reflection layer 90 is 40% to 50%. In the reflection layer 90 of the present application, by reducing a percentage of the reflection material to reduce the reflectivity of the projection screen, the reflection to the ambient light is effectively reduced, thereby increasing a contrast of the projection screen. In addition, in the reflection layer 90 of the present application, by adding absorbing material to increase absorption to the ambient light, the contrast of the projection screen is further increased. In the reflection layer 90 of the present application, by adding a diffusion medium to increase an emergence angle of the projection light, the visible angle of the projection screen is further increased.

Specifically, in the present application, the projection light is diffused multiple times on the projection screen 100. Firstly, the projection light is diffused through the diffusion layer 60, and this diffusion is an ellipse or a circle diffusion with Gaussian 20° to 60° in a longitudinal direction, and Gaussian 5° to 20° in a longitudinal direction. Then the projection light is reflected and diffused simultaneously on the reflection layer 90, and this diffusion is a Gaussian or Lamber scatter with a diffusion angle 10° to 30°. Finally, the projection light returns to the diffusion layer 60, to further be diffused and then emitted. In this way, finally a horizontal field angle of the projection screen 100 is greater than 45°, and a longitudinal field angle is greater than 20°. A surface microstructure may also be applied to the diffusion layer 60 for performing a surface diffusion. The diffusion layer 60 control the scattering angle of light by the surface microstructure. A specific process includes fixing the surface microstructure on the substrate 10 by hot padding or UV glue.

It is known from the above description that in the projection screen 100 of the present application, the visible angle of the projection screen 100 is increased by the diffusion layer 60 and the reflection layer 90, an anti-ambient light capability is further increased, and a better contrast can be obtained. However, when the projector is placed in front of the projection screen, the projection light of the projector is incident on a bottom surface of the projection screen 100 approximately vertically, and thus the incident light has a smaller incident angle. The projection light incident on a top of the projection screen has a larger incident angle. In this case, the emitted projection light has a larger reflection angle, such that a majority of projection light emitted from the top of the projection screen is far away from a viewing position of the viewer. Although the diffusion layer can diffuse a part of the projection light to the viewing position of the viewer, a majority of projection light is still wasted, such that the projection screen 100 has a relatively low brightness and an inconsistent bright uniformity.

Figure 3:
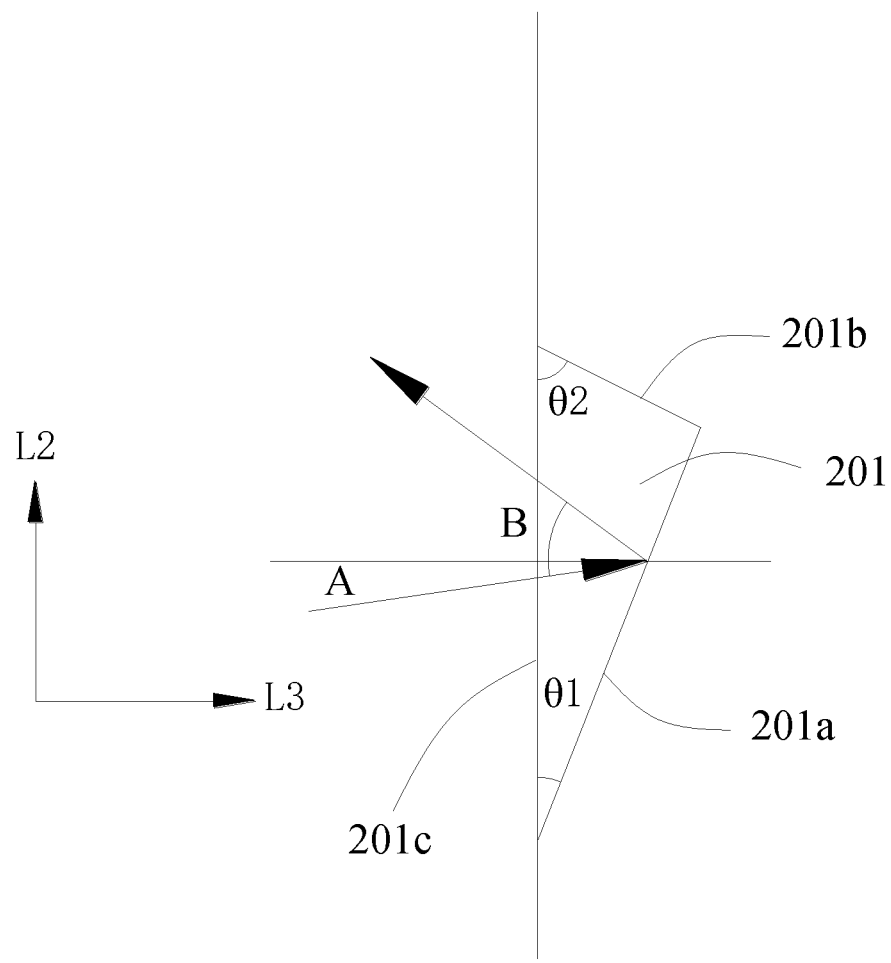
FIG. 3 is a structure schematic diagram of a first wire grid structure in FIG. 2.
Figure 4:
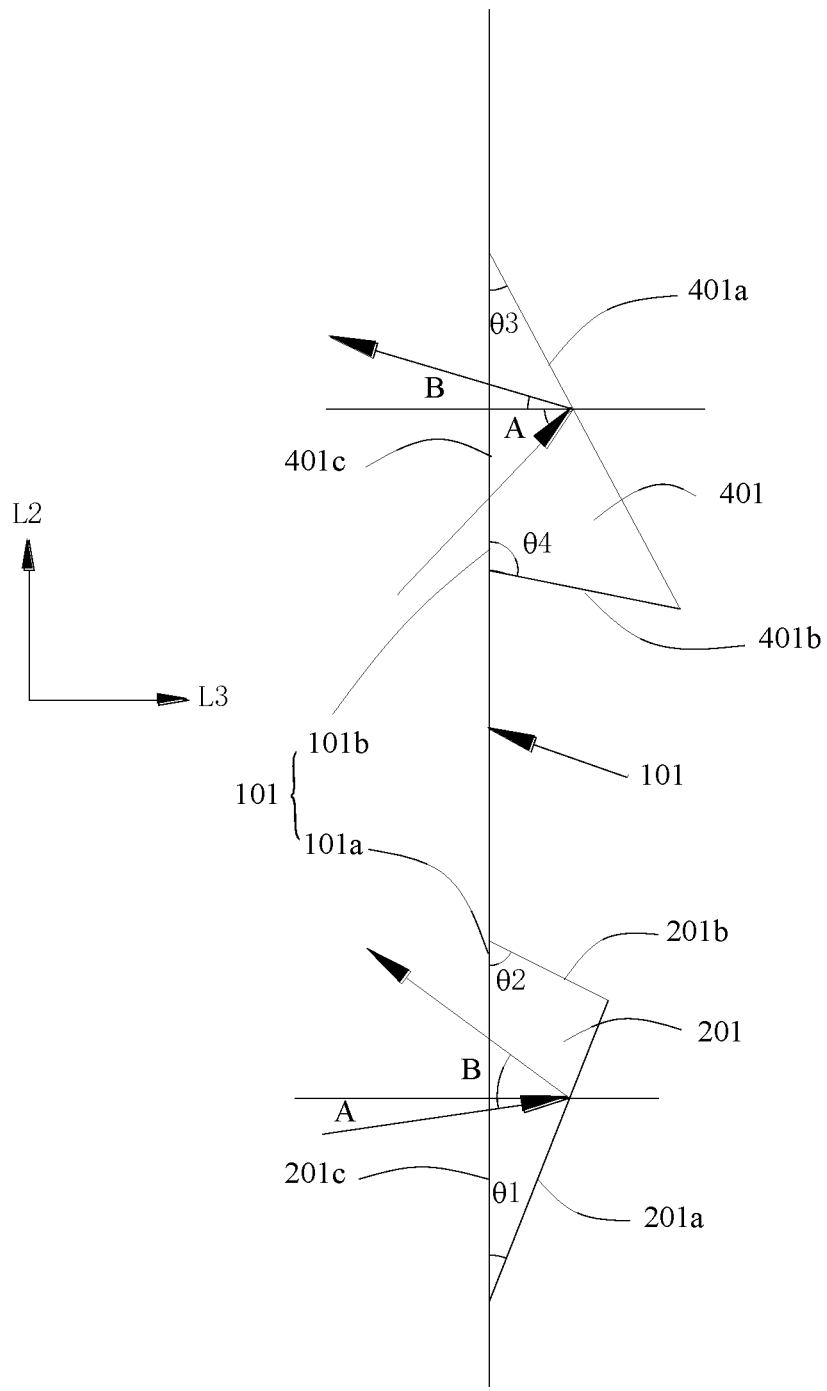
FIG. 4 is a structure schematic diagram of a first wire grid structure and a second wire grid structure according to a first embodiment of the present application.

Referring to FIG. 3 to FIG. 4, to solve this problem, the projection screen 100 according to an embodiment of the present application further includes a first wire grid structure 20 provided on a surface of the substrate. The substrate 10 includes a first substrate surface 101 away from the projector 200. The first substrate surface 101 includes a first area 101a and a second area 101b adjacent to the first area 101a. The first area is provided with multiple first wire grid bodies extending along a first direction. Each first wire grid body 201 includes a first contact surface 201c connected with the substrate, and a first surface 201a. There is a first angle $\theta_1$ between the first surface 201a and the first contact surface 201c. Multiple first angles $\theta_1$ reduces gradually along a direction from the first area 101a to the second area 101b. It should be noted that in an embodiment, the substrate 10 and the first wire grid structure 20 are formed integrally. That is to say, the first wire grid body 201 is formed on the first substrate surface 101 of the substrate 10 by transfer.

In the present application, compared with a traditional projection screen, the first wire grid body 201 is added on the first substrate surface 101 of the substrate 10. The first wire grid body 201 is located on the first area 101a of the first substrate surface 101 of the substrate 10, i.e., the first wire grid structure 20 is located at an area below the center of the projection screen 10. The projection light emitted from the projector 200 is incident on the first area of the projection screen. In this case, an incident angle corresponding to the projection light is smaller. Several first wire grid bodies 201 are provided on the first area 101*a*, and there is the first angle $\theta_1$ between the first surface 201*a* of the first wire grid body 201 and the first substrate surface 101. The incident angle of the projection light on the first surface 201*a* is increased by the first angle $\theta_1$, and a reflection angle of the projection light can be correspondingly increased. Thus, the projection light can be reflected to a higher position, such that the projection light is emitted from a position close to the center of the projection screen and the projection light can enter into a viewer sight as much as possible. With the projection light moving from the bottom to the position close to the center of the projection screen 10, the incident angle of the projection light is larger and larger, and the reflection angle of the projection light is larger and larger as well. The projection light may be emitted above the projection screen 100, and cannot enter into viewer eyes. The first angles $\theta_1$ in the present application are reduced gradually along the direction from the first area 101*a* to the second area 101*b*, i.e., extending upwardly from the bottom of the projection screen 100. The first surface 201*a* is closer and closer to the first substrate surface 101, which will reduce the incident angle of the projection light and correspondingly reduce the reflection angle of the projection light. The projection light will be emitted from the position close the center of the projection screen, such that the projection light may enter into the viewer sight as much as possible.

Each first wire grid body 201 further includes a second surface 201*b*. There is a second angle $\theta_2$ between the second surface 201*b* and the first contact surface 201*c*. The second angle $\theta_2$ is greater than a first threshold. Specifically, in the case that a thickness of the first wire grid body 201 and the first angle $\theta_1$ are determined, an extending trend of the second surface 201*b* is opposite to that of the incident projection light in order to reduce an interference of the second surface 201*b* to the projection light as much as possible. If the second angle $\theta_2$ is relatively smaller, an area of the second surface 201*b* is relatively larger, more incident projection light will be incident on the second surface 201*b*. The incident projection light will be reflected by the second surface 201*b* to a lower position, which is hard to enter into the viewer eyes. This part of projection light cannot contribute to the image light on the projection screen, rendering a loss of projection light. Therefore, the second angle $\theta_2$ needs to be greater than the first threshold in order to avoid the projection being incident on the second surface 201*b* as much as possible.

An angle between a normal direction of the projection screen 100 and the incident projection light is defined as A, and an angle between the projection light reflected by the projection screen 100 and the normal direction of the projection screen 100 is defined as B. In order to avoid the projection light being incident on the second surface 201*b*, it is necessary to set the first threshold to be 90°-B, i.e., $\theta_2 > 90°-B$. In the case that the thickness of the first wire grid body 201 and the first angle $\theta_1$ is determined, if $\theta_2 < 90°-B$, the second surface 201*b* is close to the first substrate surface 101. In this case, the area of the second surface is larger, and more incident projection light is incident on the second surface 201*b*. This part of light is reflected to a lower position by the second surface 201*b*, which thus is difficult to provide the image light of the projection screen. Therefore, more projection light loss is caused, and a defect in the non-uniform brightness distribution at the viewer side is brought. When the second angle $\theta_2$ between the second surface 201*b* and the first contact surface 201*c* is greater than the first threshold, a majority of the incident projection light will be incident on the first surface 201*a* and be reflected on the first surface 201*a*.

Referring back to FIG. 4, the second area of the projection screen 100 is provided with multiple second wire grid bodies extending along the first direction. Each second wire grid body 401 includes a second contact surface 401*c* connected with the substrate and a third surface 401*a*. There is a third angle $\theta_3$ between the third surface 401*a* and the second contact surface 401*c*. Multiple third angles $\theta_3$ increase gradually in the direction from the first area 101*a* to the second area 101*b*. It is noted that in an embodiment, the substrate 10 and the second wire grid structure 40 are formed integrally. That is, the second wire grid structure 400 is formed on the first substrate surface 101 of the substrate 10 by transfer.

In the present application, compared with a traditional projection screen 100, the second wire grid body 401 is added on the substrate 10 of the projection screen 100. The second wire grid body 401 is provided on the second area 101*b*.

It can be known from the above description that the incident projection light includes the projection light incident on the first area 101*a* and the projection light incident on the second area 101*b*. An incident angle of the projection light incident on the second area 101*b* is greater than that of the projection light incident on the first area 101*a*. When the incident angle of the projection light is greater than a preset threshold, the incident projection light will enter to the second wire grid body 401 of the second wire grid structure 40. That is, the incident projection light will be reflected by the third surface 401*a* of the second wire grid body 401. Moreover, since the extending trend of the third surface 401*a* of the second wire grid body 401 is opposite to an incident direction of the projection light, the projection light will be incident on the third surface 401*a* in that case that the third angle $\theta_3$ is not large. Since the second wire grid body 401 is located in a higher position of the projection screen 100, the incident angle of the incident projection light on the third surface 401*a* will be larger. Therefore, a reflection angle will be larger correspondingly. However, the first substrate surface 101 of the present application is provided with multiple second wire grid bodies 401. There is the third angle $\theta_3$ between the third surface 401*a* and the second contact surface 401*c* of the second wire grid body 401. The incident angle of the projection light incident on the third surface 401*a* is reduces due to the third angle $\theta_3$, thus reducing the reflection angle of the projection light correspondingly. Therefore, the projection light may be reflected to a lower position and will be emitted from a position close to the center of the projection screen 100, and thus more projection light may enter into the viewer sight.

With the projection light moving from the center of the projection screen 100 to the top of the projection screen 100, the incident angle of the projection light is larger and larger, and a reflection angle of the projection light is larger and larger as well. The projection light may be emitted above the projection screen 100, and cannot enter into viewer eyes. The third angles $\theta_3$ in the present application are increased gradually along the direction from the center of the projection screen 100 to the top of the projection screen 100, i.e., extending upwardly from the center of the projection screen 100. The third surface 401*a* is farther and farther away from the first substrate surface 101, which will reduces the incident angle of the projection light, and correspondingly reduce the reflection angle of the projection light. The projection light will be emitted from a position close the center of the projection screen, and more projection light may enter into the viewer sight.

It is noted that, in the present application, illustration is made to the projection light when the projector located at the bottom of the projection screen. In an embodiment, the projector may be arranged at the top of the projection screen (a hoisted projector). In this case, wire grid structures of the projection screen may have an opposite angle change as above, which will not be repeated here.

Therefore, in the present application, by gradually reducing the first angle $\theta_1$ between the first surface 201a and the first contact surface 201c along the direction from the first area 101a to the second area 101b, both of the projection light at the bottom of the projection screen and that in the position below the center of the projection screen can be reflected to a position close to the center of the projection screen. That is, the projection light at the bottom of the projection screen and the projection light in the position below the center of the projection screen can converge to the center of the projection screen. Thus, approximately identical light enters into viewer eyes, increasing the brightness gain of the projection screen.

In the present application, by gradually increasing the third angle $\theta_3$ between the third surface 401a and the second contact surface 401c along the direction from the first area 101a to the second area 101b, both of the projection light at the top of the projection screen and that in a position above the center of the projection screen can be reflected to the position close to the center of the projection screen 100. That is, the projection light at the top of the projection screen and the projection light in the position above the center of the projection screen can converge to the center of the projection screen 100. Thus, approximately identical light enters into viewer eyes, increasing the brightness gain of the projection screen 100.

Therefore, in the present application, the projection light is reflected to the position close to the center of the projection screen 100 as much as possible, so as to increase the brightness of a center area of the projection screen as much as possible, thus increasing the brightness gain of the projection screen.

Each second wire grid body 401 further includes a fourth surface 401b. There is a fourth angle $\theta_4$ between the fourth surface 401b and the second contact surface 401c. The fourth angle $\theta_4$ is greater than a second threshold. Specifically, in the case that a thickness of the second wire grid body 410 and the third angle $\theta_3$ are determined, if the fourth angle $\theta_4$ is too small and an area of the fourth surface 401b is relatively large, more projection light is incident on the fourth surface 401b, and the incident projection light is reflected to a higher position by the fourth surface 401b. Thus, the reflected projection light cannot enter into viewer eyes, which will result into a loss of the projection light. Therefore, in order to avoid too much projection light being incident on the fourth surface 401b, the fourth angle $\theta_4$ between the fourth surface 401b and the second contact surface 401c is required to be greater than the second threshold.

In this embodiment, in order to avoid the projection light being incident on the fourth surface 401b, the second threshold needs to be set as 90°-A, i.e., $\theta_4$>90°-A. Therefore, when the fourth angle $\theta_4$ between the fourth surface 401b and the second contact surface 401c is greater than the second threshold, a majority of incident projection light is incident and reflected on the third surface 401a.

In the present application, a boundary between the first area 101a and the second area 101b, i.e., a segment in which the first wire grid structure 20 and the second wire grid structure 40 are provided, is determined by the following equation. Here, the first angle $\theta_1$ satisfies the following equation (1), and the third angle $\theta_3$ satisfies the following equation (2).

$$\theta_1 = \frac{B-A}{2} \quad (1)$$

$$\theta_3 = \frac{A-B}{2} \quad (2)$$

When A=B, $\theta_1=\theta_3$. The projected incident light will transit from the first wire grid structure 20 to the second wire grid structure 40, i.e., from the first surface 201a to the third surface 401a.

Figure 5:
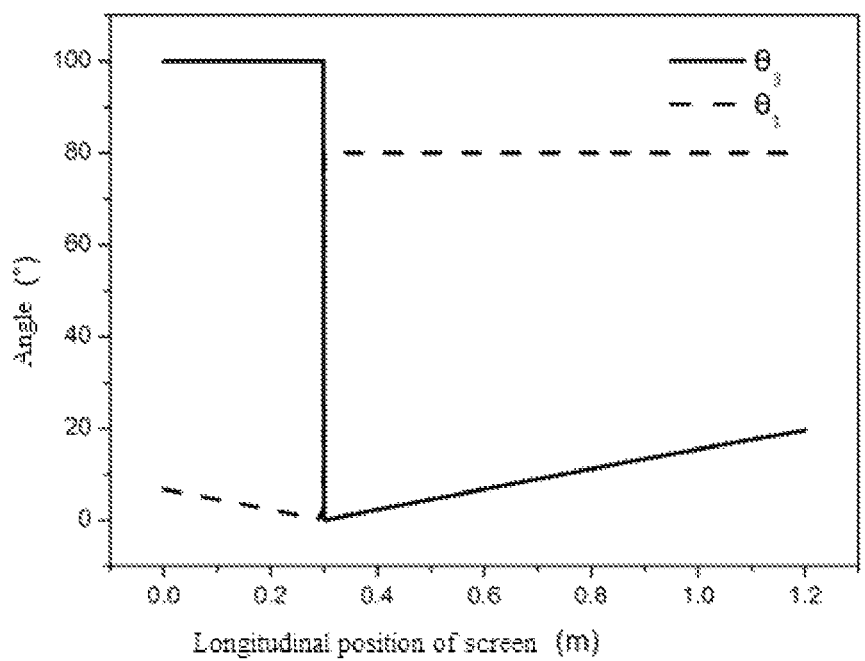
FIG. 5 is a schematic diagram of changes of a first angle and a third angle according to a first embodiment of the present application.

Referring to FIG. 5, in a specific implementation, in a direction (the second direction) perpendicular to the projection screen, the boundary between the first area 101a and the second area 101b is located at 0.3 m away from the bottom. That is, the first wire grid structure 10 transits to the second wire grid structure 40, at 0.3 m above the bottom. Moreover, the first angle $\theta_1$ changes from an initial 20° to 0°, at 0.3 m above the bottom. In this case, A=B. The projected incident light will transit from the first wire grid structure 20 to the second wire grid structure 40, and the projected incident light will be incident on the third surface 410a. The third angle $\theta_3$ ranges from 0° to 20°.

In this embodiment, the first wire grid structure 20 and the second wire grid structure 40 are provided between the substrate 10 and the reflection layer 90.

In this embodiment, the reflection layer 90 may cover the first wire grid structure 20 or the second wire grid structure 40 by spraying, screen printing, and printing, etc. A thickness of the reflection layer 90 is controlled to be 10 micron to 3 millimeter. In some embodiments, spraying enables the reflection layer 90 to profile-followed attach to the surface of the first wire grid structure 20 or the second wire grid structure 40 well. Although there is a defect such as disbonding due to the environment, the optical properties such as reflection and absorbing of the projection screen 100 are not influenced since the defects takes place outwardly. The reflection layer 90 of the present application does not use a process such as magnetron sputtering or evaporation coating, such that a manufacturing speed is greatly increased and a cost is reduced greatly.

The first wire grid structure 20 and/or the second wire grid structure 40 is transparent or gray. The substrate 10 is transparent or gray. A color combination for the first wire grid structure 20 and/or the second wire grid structure 40, and the substrate 10 is as follows.

A first color combination includes: a gray substrate 10, and a gray first wire grid structure 20 and/or a gray second wire grid structure 40.

A second color combination includes: a transparent substrate 10, and a transparent first wire grid structure 20 and/or a transparent second wire grid structure 40.

A third one color combination includes: a transparent substrate 10, and a gray first wire grid structure 20 and/or a gray second wire grid structure 40.

A fourth color combination includes: a gray substrate 10, and a transparent first wire grid structure 20 and/or a transparent second wire grid structure 40.

In the above color combination of the gray substrate 10, and the gray first wire grid structure 20 and/or the gray second wire grid structure 40, the ambient light may be further absorbed when the ambient light is relatively bright, so as to increase the contrast of the projection screen.

The substrate 10 is made by extrusion. The gray substrate 101 may be made by doping black absorbing material particles to the transparent substrate material. The black material particles includes organic pigments such as AZO and inorganic pigments such as carbon black, graphite, metallic oxide. If the first wire grid structure 20 and/or the second wire grid structure 40 is made by hot padding, the first wire grid structure 20 and/or the second wire grid structure 40 has the same color. If the first wire grid structure 20 and/or the second wire grid structure 40 is made by UV glue transfer printing, the black absorbing material, such as organic pigments (AZO and so on) and inorganic pigments (such as carbon black, graphite, metallic oxide, and so on), needs to be doped in the mixing process of the UV glue.

Figure 6:
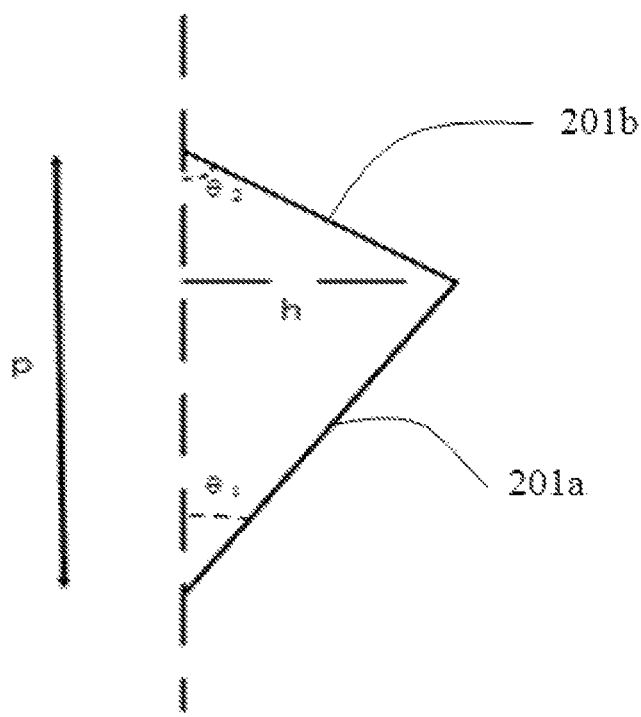
FIG. 6 is a schematic diagram of a size of a first wire grid body.

Referring to FIG. 6, a thickness h for the first wire grid structure 20 and/or the second wire grid structure 40 is 5 µm-100 µm. Specifically, a size p of each first wire grid body 201 of the first wire grid structure 20 and a thickness h of the first wire grid structure 20 satisfy an equation (3) below.

$$p = h * \left( \frac{1}{\tan\theta_1} + \frac{1}{\tan\theta_2} \right) \quad (3)$$

The size p of the first wire grid body 201 can be obtained as 20 µm to 300 µm by the above equation (3). In addition, if the size p of the first wire grid body 201 is fixed to be 100 µm, inverse computation may be performed to obtain the thickness of the first wire grid structure 20 to be 0-35 µm.

Similarly, a size p of each second wire grid body 401 of the second wire grid structure 40 and a thickness h of the second wire grid body 401 also satisfy the above equation. Similarly, the size p of the second wire grid body 401 can be obtained as 20 µm to 300 µm. Similarly, if the size p of the second wire grid body 401 is 100 µm, inverse computation may be performed to obtain the thickness of the second wire grid body 401 to be 0-35 µm.

Figure 7:
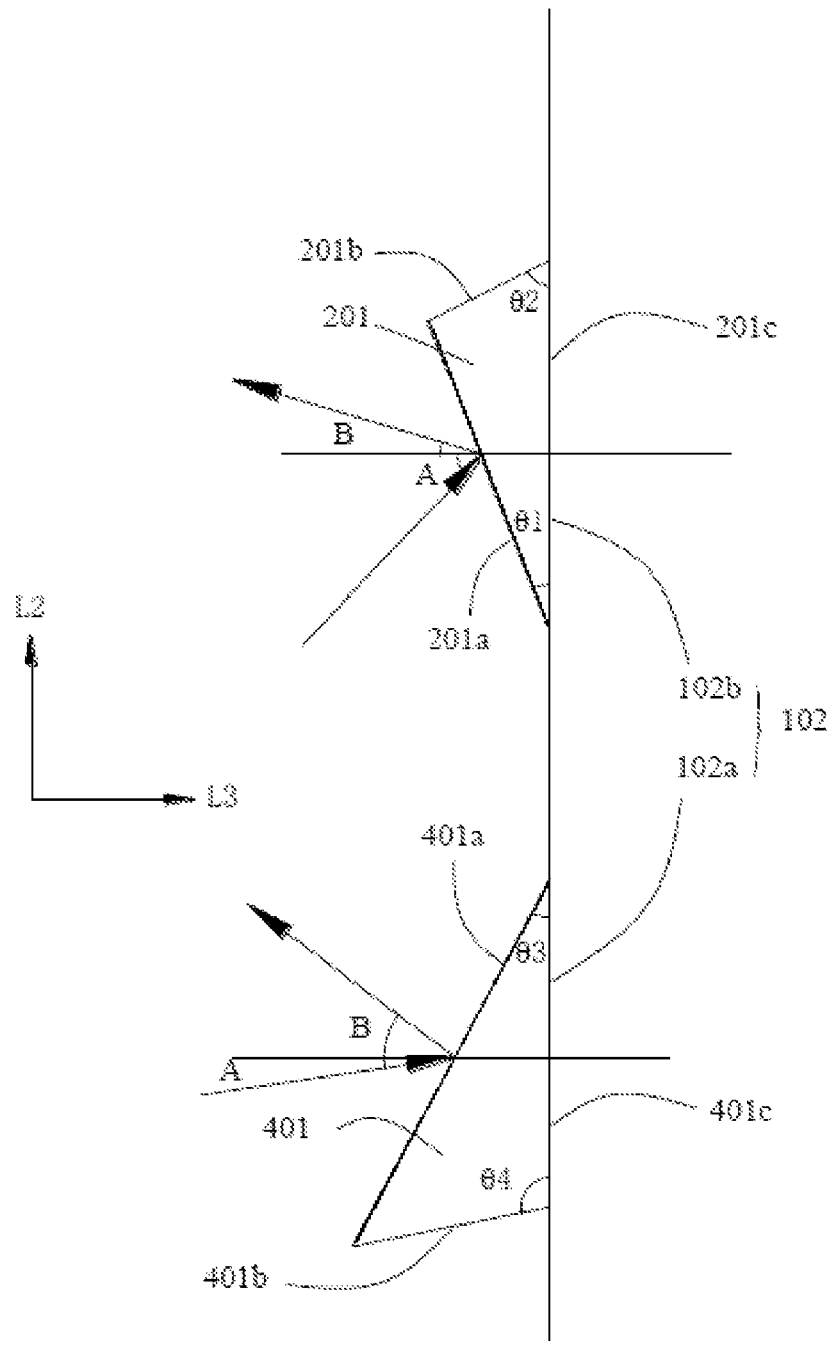
FIG. 7 is a structure schematic diagram of a first wire grid structure and a second wire grid structure according to a second embodiment of the present application.

Referring to FIG. 7, in a second embodiment of the present application, the first wire grid structure 20 and the second wire grid structure 40 are provided between the substrate 10 and the diffusion layer 60.

The substrate 10 includes a second substrate surface 102 towards the projector 200, and the second substrate surface 102 includes a third area 101a and a fourth area 102b connected with the third area 102a. The third area 102a is horizontally connected with a second plane P2. The second wire grid structure 40 is provided on the third area 102a and extends along the first direction of the projection screen 100. The second wire grid structure 40 includes successively connected multiple second wire grid bodies 401. Each second wire grid body 401 has a thickness direction perpendicular to the first direction of the projection screen 100. Each second wire grid body 401 includes a second contact surface 401c and a third surface 401a. The second contact surface 401c contacts to the second substrate surface 102. There is a third angle θ₃ between the third surface 401a and the second contact surface 401c. The third angle θ₃ faces the third area 102a. Multiple third angles reduce gradually along a direction from the third area 102a to the fourth area 102b.

Similarly, it can be known from the description of the first embodiment that, when the multiple third angles θ₃ reduce gradually along the direction from the third area 102a to the fourth area 102b, the third surface 401a is more and more close to the second substrate surface 102, thus reducing the incident angle of the projection light. Correspondingly, the reflection angle of the projection light will be smaller, and the projection light will emit from a position closer to the center of the projection screen 100. Therefore, more projection light can enter into the viewer sight.

The first wire grid structure 20 is provided on the fourth area 102b and extends along the first direction of the projection screen 100. The first wire grid structure 20 includes successively connected multiple first wire grid bodies 201. Each first wire grid body 201 has a thick direction perpendicular to the first direction of the projection screen 10. Each first wire grid body 201 includes a first contact surface 201c and a first surface 201a. The first contact surface 201c contacts with the second substrate surface 102. There is a first angle θ₁ between the first surface 201a and the first contact surface 201c. The first angle θ₁ faces the fourth area 102b. Multiple first angles θ₁ increase gradually along the direction from the third area 102a to the fourth area 102b.

Similarly, it can be known from the description of the first embodiment that, when the multiple first angles θ₁ increase gradually along the direction from the third area 102a to the fourth area 102b, the first surface 201a is farther and farther away from the second substrate surface 102, thus reducing the incident angle of the projection light. Correspondingly, the reflection angle of the projection light will be reduced as well, and the projection light will emit from a position closer to the center of the projection screen 100. Therefore, more projection light can enter into the viewer sight.

In this embodiment, the first wire grid structure 20 and/or the second wire grid structure 40 is transparent or gray. The substrate 10 is transparent, black or gray. A color combination of the first wire grid structure 20 and/or the second wire grid structure 40, and the substrate 10 is as follows.

A first color combination includes: a black substrate 10, and a transparent first wire grid structure 20 and/or a transparent second wire grid structure 40.

A second color combination includes: a gray substrate 10, and a transparent first wire grid structure 20 and/or a transparent second wire grid structure 40.

A third color combination includes: a transparent substrate 10, and a transparent first wire grid structure 20 and/or a transparent second wire grid structure 40.

A fourth color combination includes: a black substrate 10, and a gray first wire grid structure 20 and/or a gray second wire grid structure 40.

A fifth color combination includes: a gray substrate 10, and a gray first wire grid structure 20 and/or a gray second wire grid structure 40.

A sixth color combination includes: a transparent substrate 10, and a gray first wire grid structure 20 and/or a gray second wire grid structure 40.

In this embodiment, since the projection light firstly enters into the first wire grid structure 20 and/or the second wire grid structure 40 and then enters into the substrate 10, the substrate 10 may be black or transparent. A black substrate 10 can further absorb the transmitted light. A transparent substrate 10 enables the transmitted light to emit from a back of the projection screen 100 directly. Therefore, the contrast of the projection screen 100 will not be influenced.

Figure 8:
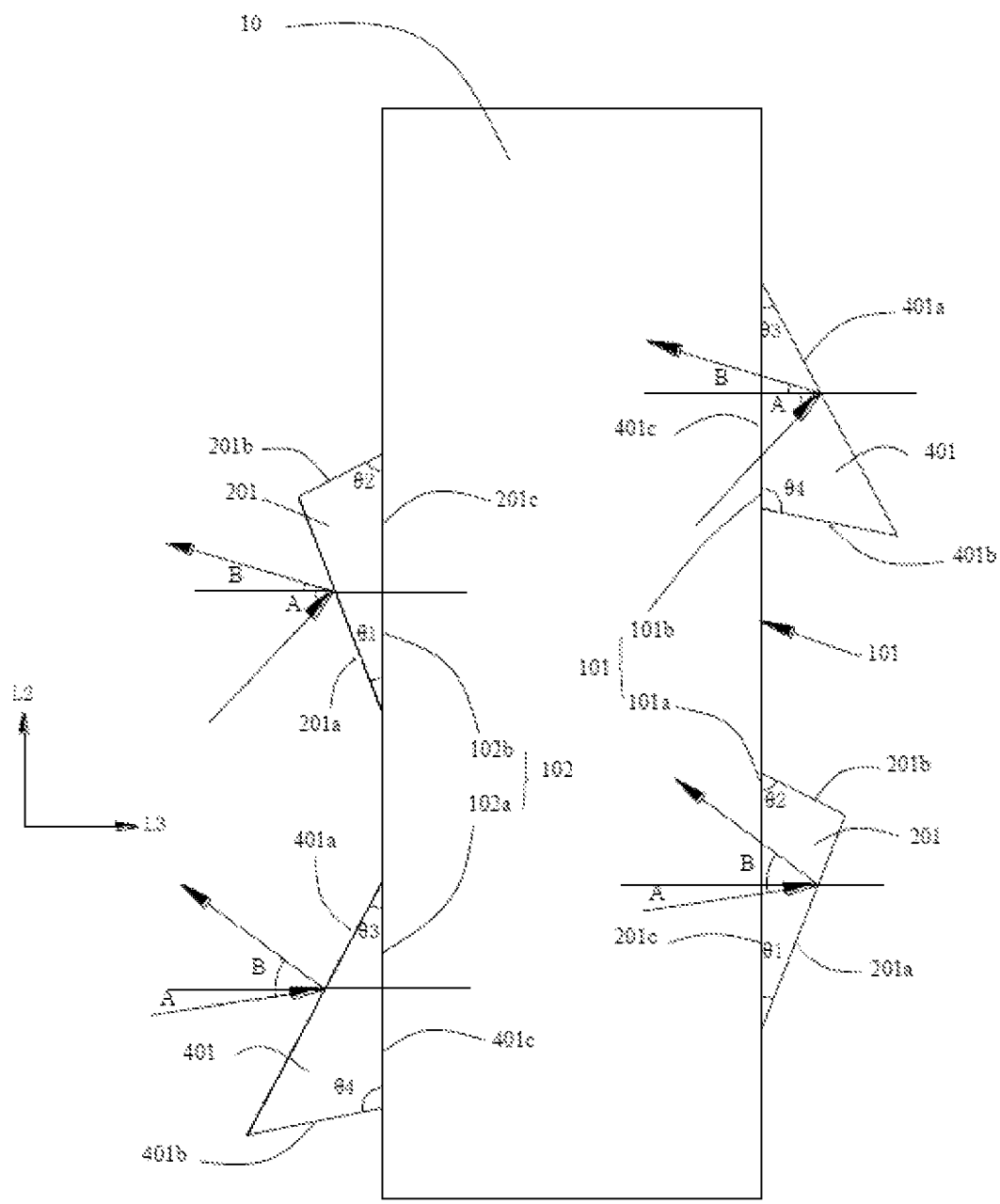
FIG. 8 is a structure schematic diagram of a first wire grid structure and a second wire grid structure according to a third embodiment of the present application.

Referring to FIG. 8, a third embodiment of the present application differs from the first and the second embodiments in that there are two groups of the first wire grid structures 20. One group of first wire grid structures is provided on the first area 101a, and the other group of first wire grid structures 20 is provided on the fourth area 102b.

A specific arrangement is identical with those in the first embodiment and the second embodiment. There are two groups of second wire grid structures 40. One group of second wire grid structures 40 is provide on the second area 101b, and the other group of second wire grid structures 40 is provided on the third area 201a. A specific arrangement for this is identical to those in the first embodiment and the second embodiment.

In this embodiment, a group of first wire grid structures 20 and a group of second wire grid structures 40 are provided between the substrate 10 and the reflection layer 90. The other group of first wire grid structures 20 and the other group of second wire grid structures 40 are provided between the substrate 10 and the diffusion layer 60. Therefore, in this embodiment, a combined effect of the first embodiment and the second embodiment may be obtained. Regardless of the projection light incident on the bottom of the projection screen 100 or on the top of the projection screen 100, the projection screen 100 can emit the projection light from a position close to the center of the projection screen 100, and more projection light may enter into the viewer sight.

Figure 9:
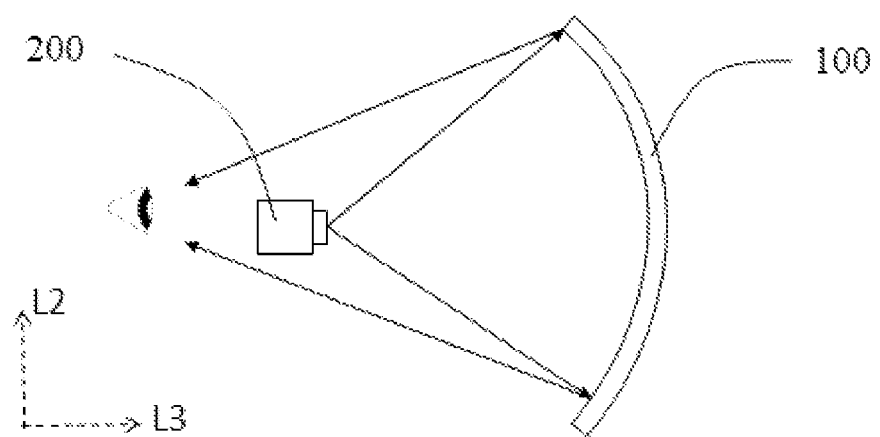
FIG. 9 is a structure schematic of a curved projection screen according to a fifth embodiment of the present application.

Referring to FIG. 9, in a fourth embodiment of the present application, the projection screen 100 may be a curved screen with an arc shape. A bending direction of the projection screen 100 faces the projector 200 and the viewer. The center of the projection screen 100 is located in the viewer sight. Therefore, regardless of the shape of the projection screen 100, light reflected through the curved projection screen 100 with the arc shape may enter into the viewer sight, further increasing the brightness uniformity of the projection screen 100.

For the above embodiment, a simulation experiment is as follows.

Figure 10:
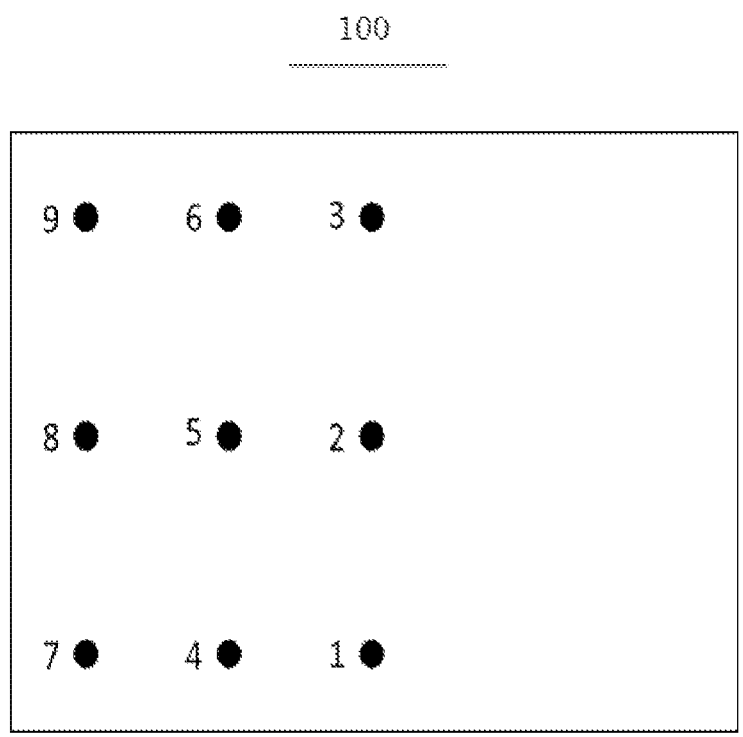
FIG. 10 is a structure schematic diagram of a nine-point uniformity applied in a brightness representation method of a projection screen according to the present application.

Referring to FIG. 10, in order to represent the brightness uniformity of a screen, a representation method for the screen brightness uniformity is introduced in the present application. In the representation method, a nine-point uniformity may be used. Nine points distribute uniformly in half of the screen, and a brightness is L (n, n=1, 2, ..., 9). The brightness uniformity is expressed by a ratio between a minimum brightness and a center brightness, which is expressed by an equation (4) below.

$$9\text{-point uniformity} = \frac{\min L(n)}{L(2)} \quad (4)$$

Figure 11:
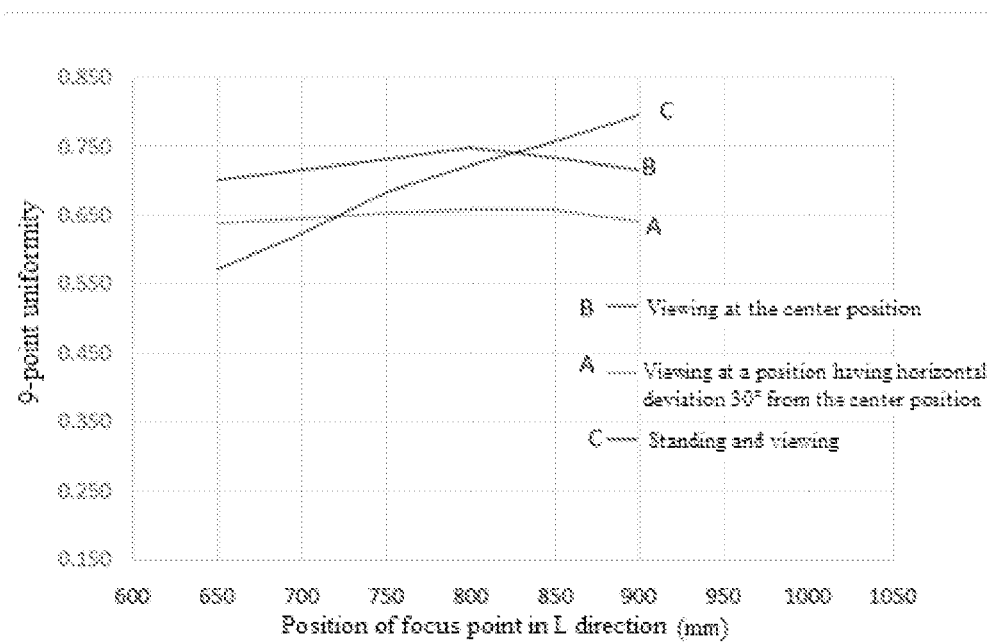
FIG. 11 is a brightness changing curve of a nine-point uniformity at different positions of the projection screen.

As recited above, the first wire grid structure 20 and the second wire grid structure 40 is used to reflect the projection light to a field of view of the viewer. An intersecting position of the reflected projection light is an intersection point of the projection screen 100. A position of the intersection point will influence the brightness uniformity of the projection screen 100. By an optical simulation, it can be determined that the projection brightness uniformity is almost irrelevant with a distance from the focus point to the projection screen 100. However, when the position of the intersecting point changes along the direction perpendicular to the screen, a change of the nine-point uniformity can be shown in FIG. 11 by the optical simulation. In the optical simulation, three angles of view are considered, which includes an angle of view sitting front and facing the true center of the screen, an angle of view having a constant viewing height and horizontal deviation 30° from the center position, and an angle of view standing at the true center of the screen. By comprehensive simulation for these angles of view, the brightness uniformity of the screen is above 70%, and the brightness uniformity is better.

In conclusion, in the present application, by gradually reducing the first angles between the first surface and the first contact surface along the direction from the first area to the second area, both of the projection light at the bottom of the projection screen and that at a position below the center of the projection screen can be reflected to a position close to the center of the projection screen. That is to say, the projection light at the bottom of the projection screen and the projection light at a position below the center of the projection screen can converge to the center of the projection screen. In this way, approximately identical light can be enter into viewer's eyes, increasing the visible angle of the projection screen and increasing a brightness uniformity of the projection screen.

The above embodiments are only preferable embodiments of the present application, and of course cannot limit the scope of the present application. A person skilled in the art can understand and realize all or part of the process of the above embodiments, and equivalent variations made according to claims of the present application still fall into the scope covered by the present application.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A projection screen, comprising: a substrate comprising a first substrate surface,
   wherein the first substrate surface comprises a first area and a second area adjacent to the first area, the first area being provided with a plurality of first wire grid bodies extending along a first direction, and the second area being provided with a plurality of second wire grid bodies extending along the first direction;
   the plurality of first wire grid bodies constitute a first wire grid structure, and the plurality of second wire grid bodies constitute a second wire grid structure;
   each of the plurality of first wire grid bodies comprises a first contact surface connected with the substrate, and a first surface that is configured to reflect an incident projection light, wherein a first angle is formed between the first contact surface and the first surface, and the first angle reduces gradually along a direction from the first area to the second area; and
   each of the plurality of second wire grid bodies comprises a second contact surface connected with the substrate, and a third surface that is configured to reflect an incident projection light; wherein a third angle is formed between the second contact surface and the third surface, and the third angle increases gradually along the direction from the first area to the second area;

wherein an angle between the first contact surface and the incident projection light changes along the direction from the first area to the second area, and another angle between the second contact surface and the incident projection light changes along the direction from the first area to the second area.

2. The projection screen according to claim 1, wherein the first angle ranges from 0° to 20°.

3. The projection screen according to claim 1, wherein each of the plurality of first wire grid bodies further comprises a second surface, wherein a second angle is formed between the second surface and the first contact surface, and the second angle is greater than a first threshold.

4. The projection screen according to claim 3, wherein an angle between a normal direction of the projection screen and an incident projection light is defined as A, and an angle between a projection light reflected by the projection screen and the normal direction of the projection screen is defined as B, then the first threshold is defined as 90°-B.

5. The projection screen according to claim 1, wherein the third angle ranges from 0° to 20°.

6. The projection screen according to claim 1, wherein each of the plurality of second wire grid bodies further comprises a fourth surface, wherein a fourth angle is formed between the fourth surface and the second contact surface, and the fourth angle is greater than a second threshold.

7. The projection screen according to claim 6, wherein an angle between a normal direction of the projection screen and an incident projection light is defined as A, and an angle between a projection light reflected by the projection screen and the normal direction of the projection screen is defined as B, then the second threshold is defined as 90°-B.

8. The projection screen according to claim 1, wherein the substrate further comprises a second substrate surface provided opposite to the first substrate surface, wherein the second substrate surface comprises a third area and a fourth area adjacent to the third area, and wherein the fourth area is provided with a plurality of first wire grid bodies extending along the first direction.

9. The projection screen according to claim 8, wherein the third area is provided with a plurality of second wire grid bodies extending along the first direction.

10. The projection screen according to claim 9, wherein each of the plurality of second wire grid bodies further comprises a fourth surface, wherein a fourth angle is formed between the fourth surface and the second contact surface, and the fourth angle is greater than a second threshold; and an angle between a normal direction of the projection screen and an incident projection light is defined as A, and an angle between a projection light reflected by the projection screen and the normal direction of the projection screen is defined as B, then the second threshold is 90°-B.

11. The projection screen according to claim 9, wherein each of the plurality of first wire grid bodies further comprises a second surface, wherein a second angle is formed between the second surface and the first contact surface; and the first angle is defined as $\theta_1$, and the second angle is defined as $\theta_2$, then a size p of each first wire grid body of the first wire grid structure and a thickness h of the first wire grid structure satisfy:

$$p = h * \left(\frac{1}{\tan\theta_1} + \frac{1}{\tan\theta_2}\right).$$

12. The projection screen according to claim 9, wherein an angle between a normal direction of the projection screen and an incident projection light is defined as A, an angle between a projection light reflected by the projection screen and the normal direction of the projection screen is defined as B, the first angle is defined as $\theta_1$, and the third angle is defined as $\theta_3$, then a boundary between the first area and the second area satisfy:

$$\theta_1 = \frac{B - A}{2}, \text{ and}$$

$$\theta_3 = \frac{A - B}{2},$$

and when A=B, $\theta_1 = \theta_3$.

13. The projection screen according to claim 9, further comprising a diffusion layer and a reflection layer, wherein the diffusion layer is located at a side of the substrate facing a projector, and the reflection layer is located at a side of the substrate away from the projector; and the first wire grid structure and the second wire grid structure are provided between the substrate and the diffusion layer, or the first wire grid structure and the second wire grid structure are provided between the substrate and the reflection layer.

14. The projection screen according to claim 8, wherein each of the plurality of first wire grid bodies further comprises a second surface, wherein a second angle is formed between the second surface and the first contact surface, and the second angle is greater than a first threshold; and an angle between a normal direction of the projection screen and an incident projection light is defined as A, and an angle between a projection light reflected by the projection screen and the normal direction of the projection screen is defined as B, then the first threshold is 90°-B.

15. The projection screen according to claim 1, further comprising: a diffusion layer and a reflection layer, wherein the diffusion layer is located at a side of the substrate facing a projector, and the reflection layer is located at a side of the substrate away from the projector.

16. The projection screen according to claim 15, wherein a diffusion angle of the diffusion layer is 5° to 30°.

17. The projection screen according to claim 15, wherein the first wire grid structure and the second wire grid structure are provided between the substrate and the diffusion layer, or the first wire grid structure and the second wire grid structure are provided between the substrate and the reflection layer.

18. The projection screen according to claim 1, wherein a thickness of the first wire grid structure and/or the second wire grid structure is 5 μm to 100 μm.

19. The projection screen according to claim 1, wherein each of the plurality of first wire grid bodies further comprises a second surface, and a second angle is formed between the second surface and the first contact surface; and the first angle is defined as $\theta_1$, and the second angle is defined as $\theta_2$, then a size p of each first wire grid body of the first wire grid structure and a thickness h of the first wire grid structure satisfy:

$$p = h * \left(\frac{1}{\tan\theta_1} + \frac{1}{\tan\theta_2}\right).$$

20. The projection screen according to claim 1, wherein an angle between a normal direction of the projection screen and an incident projection light is defined as A, an angle between a projection light reflected by the projection screen and the normal direction of the projection screen is defined as B, the first angle is defined as $\theta_1$, and the third angle is defined as $\theta_3$, then a boundary between the first area and the second area satisfy:

$$\theta_1 = \frac{B-A}{2}, \text{ and}$$

$$\theta_3 = \frac{A-B}{2},$$

and when A=B, $\theta_1=\theta_3$.

* * * * *